(12) United States Patent
Cheng et al.

(10) Patent No.: US 11,349,125 B2
(45) Date of Patent: May 31, 2022

(54) SPACER INCLUDED ELECTRODES STRUCTURE AND ITS APPLICATION FOR HIGH ENERGY DENSITY AND FAST CHARGEABLE LITHIUM ION BATTERIES

(71) Applicant: NEC CORPORATION, Tokyo (JP)

(72) Inventors: Qian Cheng, Tokyo (JP); Katsumi Maeda, Tokyo (JP); Noriyuki Tamura, Tokyo (JP)

(73) Assignee: NEC CORPORATION, Tokyo (JP)

( * ) Notice: Subject to any disclaimer, the term of this patent is extended or adjusted under 35 U.S.C. 154(b) by 289 days.

(21) Appl. No.: 16/339,853

(22) PCT Filed: Oct. 6, 2016

(86) PCT No.: PCT/JP2016/079802
§ 371 (c)(1),
(2) Date: Apr. 5, 2019

(87) PCT Pub. No.: WO2018/066110
PCT Pub. Date: Apr. 12, 2018

(65) Prior Publication Data
US 2019/0305317 A1   Oct. 3, 2019

(51) Int. Cl.
*H01M 4/62* (2006.01)
*H01M 4/66* (2006.01)
(Continued)

(52) U.S. Cl.
CPC .......... *H01M 4/625* (2013.01); *H01M 4/133* (2013.01); *H01M 4/587* (2013.01); *H01M 4/661* (2013.01);
(Continued)

(58) Field of Classification Search
None
See application file for complete search history.

(56) References Cited

U.S. PATENT DOCUMENTS

2010/0119956 A1   5/2010   Tokuda et al.
2015/0349332 A1   12/2015   Azami et al.

FOREIGN PATENT DOCUMENTS

JP   07-045304 A   2/1995
JP   2004-014270 A   1/2004
(Continued)

OTHER PUBLICATIONS

Machine translation of JP 2014-127370, Jul. 2014.*
(Continued)

*Primary Examiner* — Jonathan Crepeau
(74) *Attorney, Agent, or Firm* — Sughrue Mion, PLLC (57) ABSTRACT

The object of the invention is to provide a new lithium ion battery system that can have both high energy density and fast chargeable capability. The invention provides a lithium ion battery, comprising an anode comprising an anode active material layer on an anode current collector, the anode active material layer having a mass load higher than 60 g/m², a cathode comprising a cathode active material layer on a cathode current collector, the cathode active material layer having a mass load higher than 100 g/m², and an electrolytic solution comprising an imide anion based lithium salt and $LiPO_2F_2$, wherein at least one of the anode and cathode active material layers comprises a spacer composed of a hard carbon.

8 Claims, 7 Drawing Sheets

(51) Int. Cl.
*H01M 10/0525* (2010.01)
*H01M 10/0567* (2010.01)
*H01M 10/0568* (2010.01)
*H01M 10/0569* (2010.01)
*H01M 4/133* (2010.01)
*H01M 4/587* (2010.01)
*H01M 4/02* (2006.01)

(52) U.S. Cl.
CPC ... *H01M 10/0525* (2013.01); *H01M 10/0567* (2013.01); *H01M 10/0568* (2013.01); *H01M 10/0569* (2013.01); *H01M 2004/021* (2013.01); *H01M 2220/20* (2013.01); *H01M 2300/004* (2013.01); *H01M 2300/0025* (2013.01); *H01M 2300/0037* (2013.01); *Y02E 60/10* (2013.01); *Y02T 10/70* (2013.01)

(56) References Cited

FOREIGN PATENT DOCUMENTS

| | | | |
|---|---|---|---|
| JP | 2004-134175 A | 4/2004 | |
| JP | 2008-269979 A | 11/2008 | |
| JP | 2009-064574 A | 3/2009 | |
| JP | 2012-059583 A | 3/2012 | |
| JP | 2014-127370 A | 7/2014 | |
| JP | 2015-002122 A | 1/2015 | |
| JP | 2015-040157 A | 3/2015 | |
| WO | 2014/109406 A1 | 7/2014 | |
| WO | 2015/146899 A1 | 10/2015 | |
| WO | 2015/146900 A1 | 10/2015 | |
| WO | 2016/047326 A1 | 3/2016 | |

OTHER PUBLICATIONS

Machine translation of WO 2015/146900, Oct. 2015.*
Communication dated Jun. 2, 2020 from Japanese Patent Office in JP Application No. 2019-517121.
International Search Report of PCT/JP2016/079802 dated Dec. 27, 2016 [PCT/ISA/210].
Written Opinion of PCT/JP2016/079802 dated Dec. 27, 2016 [PCT/ISA/237].

* cited by examiner

SPACER INCLUDED ELECTRODES STRUCTURE AND ITS APPLICATION FOR HIGH ENERGY DENSITY AND FAST CHARGEABLE LITHIUM ION BATTERIES

CROSS REFERENCE TO RELATED APPLICATIONS

This application is a National Stage of International Application No. PCT/JP2016/079802, filed Oct. 6, 2016.

TECHNICAL FIELD

The present invention relates to a new system for fast chargeable lithium ion batteries.

BACKGROUND ART

Lithium-ion (Li-ion) batteries have been widely used for portable electronics, and they are being intensively pursued for hybrid vehicles (HVs), plug-in hybrid vehicles (PHVs), electric vehicles (EVs), and stationary power source applications for smarter energy management systems. The greatest challenges in adopting the technology for large-scale applications are the energy density, power density, cost, safety, and cycle life of current electrode materials. Among all the properties, high energy density and fast chargeable capabilities are especially important for batteries in automobile application. This is because EV users, for example, are hardly to wait more than half an hour to charge their vehicles during a long drive compared with a refueling period of less than 5 min for gasoline cars. The speed of charge greatly depends on the lithiation rate capability of anode materials, cathode materials, electrolyte as well as solvent.

Various attempts have been proposed for improving the charging rate or the power density. JP2015-040157A proposes to use a lithium iron manganese complex oxide as a cathode active material, which can provide higher energy density than a conventional lithium transition metal oxide cathode material with high capacity retention. However, there is no discussion about concrete energy density nor rate performances. On the other hands, WO2015/146899 proposes to use air treated soft carbon such as pitch cokes as an anode active material for lithium ion batteries with high charging rate. However, the pitch cokes-based soft carbon has smaller capacities than graphite or silicon based materials and it is hard to fabricate a lithium ion battery with energy density higher than 160 Wh/kg. There are some other attempts; for example, JP2009-064574A discloses a double layered anode, in which a first anode layer comprising artificial graphite closer to a current collector and a second anode layer, which is higher in charging rate characteristics than the first anode layer, comprising natural graphite on the first anode layer. Moreover, JP2015-002122A discloses graphite particles covered with at least one material selected from (1) Si or Si compounds, (2) Sn or Sn compounds, and (3) soft carbons at an edge parts of the graphite particle, where an edge of overlapped multiple layers of a carbon hexagonal network plane is exposed, to increase the charging rate. However, the production of such a multi-layered anode as shown in JP2009-064574A is costly and the control of the material quality is difficult. Also, the synthesis of the materials in JP2015-002122A is difficult and costly. The high rate characteristics were evaluated in 2 C charging in these documents and therefore, the further higher rate characteristics, for example, 6 C charge property, is not described in these documents.

On the other hands, a non-aqueous electrolytic solution is frequently used in current lithium ion battery industry. In particular, mixed solvents of cyclic carbonate such as ethylene carbonate (EC) and propylene carbonate (PC), and linear carbonate such as dimethyl carbonate (DMC), diethyl carbonate (DEC) and ethyl methyl carbonate (EMC) are used with lithium salts such as $LiPF_6$, $LiBF_4$, $LiN(SO_2CF_3)_2$, $LiN(SO_2F)_2$, $LiN(SO_2C_2F_5)_2$ and Lithium bis(oxalate) borate $(LiB(C_2O_4)_2)$ for current lithium ion batteries.

By the way, it has been known that a spacer material is added to electrode material layers to control the thickness of the layers. JP 2004-134175A discloses a spacer particle having 0.8 to 1.2 times size of the layer thickness. JP 2012-59583A discloses a spacer particle having a size of t-8 μm to t-12 μm where t is a target thickness of the electrode material layer.

CITATION LIST

Patent Literature patcit 1: JP2015-040157A
patcit 2: WO2015/146899
patcit 3: JP2009-64574A
patcit 4: JP2015-2122A
patcit 5: JP 2004-134175A
patcit 6: JP 2012-59583A

SUMMARY OF INVENTION

Technical Problem

As a result, the conventional anode materials as well as electrolyte systems are hard to satisfy the requirements for both high energy density and fast chargeable capability.

JP 2004-134175A also discloses that the addition of spacers can eliminate the insufficiency of an electrolytic solution due to the destruction of the electrode, and it can expect improvement in a cycle characteristic at reacting uniformly by the whole electrode. However, there is no evaluation about cycle characteristics.

Therefore, an object of the present invention is to provide a new lithium ion battery system that can have both high energy density and fast chargeable capability.

Solution to Problem

The present invention provides the following aspects:
[A] A lithium ion battery, including:
an anode including an anode active material layer on an anode current collector, the anode active material layer having a mass load higher than 60 g/m$^2$,
a cathode including a cathode active material layer on a cathode current collector, the cathode active material layer having a mass load higher than 100 g/m$^2$, and
an electrolytic solution including an imide anion based lithium salt and $LiPO_2F_2$,
wherein at least one of the anode and cathode active material layers includes a spacer composed of a hard carbon.
[B] The lithium ion battery according to [A], wherein the diameter of the spacer is in a range of 500 nm to 20 μm, and the ratio of a diameter of an anode or cathode active material to the diameter of the spacer is in a range of 0.5 to 20.

[C] The lithium ion battery according to [A], wherein the additive mass ratio of the spacer is in a range of 1% to 30% by mass with respect to 100% by mass of the anode or cathode active material layer.

[D] The lithium ion battery according to [A], wherein the specific surface area of the spacer is 50 $m^2/g$ or less.

[E] The lithium ion battery according to [A]-[D], wherein the electrolytic solution includes a composite of the imide anion based lithium salt and a lithium salt other than the imide anion based lithium salt as an electrolyte and the mole ratio of the imide anion based lithium salt to the lithium salt other than the imide anion based lithium salt is from 1/9 to 9/1.

[F] The lithium ion battery according to [A]-[E], wherein the total concentration of the electrolyte in the electrolytic solution is in a range of 0.1 to 3 moles/L.

[G] The lithium ion battery according to [A]-[F], wherein the cathode current collector is made of aluminum.

[H] The lithium ion battery according to [A]-[G], wherein the electrolytic solution includes ethylene carbonate (EC), dimethyl carbonate (DMC) and ethyl methyl carbonate (EMC) as solvents, with the volume ratio of ED/DMC/EMC being x:y:100-x-y, where x is 15 to 50% by volume, y is 20 to 60% by volume and x+y is less than 100% by volume.

[I] The lithium ion battery according to [A]-[H], wherein an additive amount of $LiPO_2F_2$ is 0.005 to 7% by mass with respect to 100% by mass of the electrolytic solution.

[J] The lithium ion battery according to [A]-[I], wherein the anode active material layer includes a graphite particle having pores on the surface and having hollow or interconnected pores, or interconnected inside cracks at the core part of the graphite particle as an anode active material.

Advantageous Effects of Invention

According to any one of the aspects of the present invention, a fast chargeable high energy density lithium ion battery can be provided.

DESCRIPTION OF EMBODIMENTS

Lithium Ion Battery

A lithium ion battery of one exemplary embodiment of the present invention includes a positive electrode (i.e., cathode) and a negative electrode (i.e., anode), and a spacer composed of hard carbon added to at least one electrode active material layer, and non-aqueous electrolytic solution. This invention proposes a special combination of the specific spacer included anode or cathode or both of them and electrolyte with additives to fabricate lithium ion batteries with fast chargeable capabilities.

(Anode)

The anode of the present exemplary embodiment includes a carbon material as an anode active material.

<Carbon Materials>

The carbon material can be selected from natural graphite, artificial graphite, soft carbon, hard carbon, MCMB, or their composition. The shape of the carbon material can be spherical or flake. The spherical graphite particles are preferred since the compatibility of battery industry and ease of process.

The size (diameter or length in the major axis) of the carbon material can be in the range of 1 μm to 30 μm, preferably 5 μm to 20 μm, and more preferably 7 μm to 10 μm. This is because the larger particle size will have a longer in-plane lithium ion diffuse distance when intercalation, that attribute to poor charge rate, in contrast, very small carbon particles, such as less than 1 μm will have a lot of edge plane which will have irreversible reactions with electrolyte at initial charge and discharge, which lead to low initial coulombic efficiency. The specific surface area of the carbon material is preferably controlled in the range of 1 $m^2/g$ to 15 $m^2/g$ so as to have an acceptable initial coulombic efficiency. The carbon material can also have both pores on the surface and hollow or interconnected pores, or interconnected inside cracks at the core part of the graphite material. Regarding to the definition of the core part, it is defined as the inner 70% of the volume of the carbon material.

Such a modified carbon material can be obtained by the following steps:

(S1) Graphite or graphite-carbon composite with less crystallinity, amorphous or defect rich core is prepared as a raw material.

(S2) The raw material is subjected to a first heating in an oxygen-containing atmosphere. The first heating can be carried out in an oven at a temperature of 500 to 800° C. with a temperature rising rate of 15 to 30° C./min. The concentration of oxygen is 5% to 30% by volume. Air can be used as the oxygen-containing atmosphere. The temperature and atmosphere are kept for 1 to 4 hours to activate core part of the raw material from the surface.

(S3) Thus activated carbon material is then subjected to a second heating in an inert atmosphere at a temperature higher than the temperature of the first heating with the slower temperature rising rate than the first heating. For example, the oven is first vacuumed, and then filled with 100% nitrogen and heated up to 900 to 1200° C. with the temperature rising rate of 1 to 10° C./min. The second heating can be carried out for 2 to 6 hours to obtain the modified anode material of the present exemplary embodiment. According to the slower rising rate, the morphology of the activated carbon material in the first heating can be maintained. The modified carbon material has pores on the surface and inner channels in the core part. The time of the second heating can include the temperature rising period.

The carbon materials can be further covered by a thin layer of nano particles of inorganic oxides. Graphite, especially natural spherical graphite has less lipophilicity and therefore the wettability of the carbon material to the electrolytic solution including non-aqueous organic solvents would be wrong. In high rate charging, the electrolyte ions have difficulties to achieve to the surface of the carbon material. The coating of nano particles of oxides, such as MgO or $Al_2O_3$ on the carbon material can have better wettability to the electrolytic solution than the non-coated carbon material; as a result, the rate capability can be increased.

<Spacer>

Figure 1A:
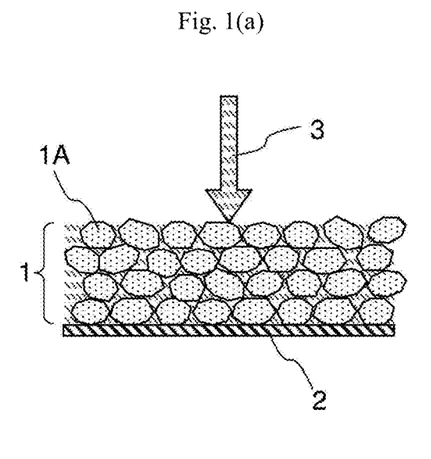
FIG. 1(a) is a schematic diagram of an electrode without spacer and FIG. 1(b) is a schematic diagram of an electrode with spacer.
Figure 1B:
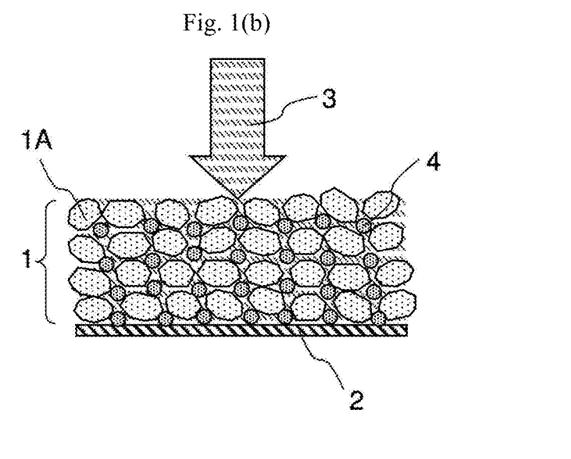

The spacer is used to increase the space in the electrodes. This is because the high energy density designed lithium ion battery needs to have high mass load of both anode and cathode, which attribute to ultra-thick electrode. The mass load of the anode is 60 $g/m^2$ or more and the mass load of the cathode is 100 $g/m^2$ or more to realize the energy density higher than 160 Wh/kg. Generally, the electrode is prepared by coating slurry containing an active material 1A on a current collector 2, drying and then pressing to fix the active material layer 1 on the current collector 2. As shown in FIG. 1(a), the conventional electrodes after pressing will have very limited spaces for maintaining the electrolyte 3. When charging such a kind of battery in high rate, the lithium ions in the electrolyte absorbed in the electrodes will be quickly consumed and lithium ion supply speed from the cathode active material is inefficient for such a thick electrode. As a result, in a short time reached the cut-off potential that causes the over potential, and therefore it can only charge a small energy. As shown in FIG. 1(b), the use of spacer 4 can provide more space to absorb the electrolyte 3 in the active material layer 1, and ensure the space is valid for both anode and cathode. The shape of the spacer can be spherical or near spherical for good performance. However, the shape of the spacer is not limited to spherical; it can also be cubic, oval, polytope and any other shapes.

The diameter of the spacer is preferably in a range of 500 nm to 20 μm. This range of the diameter is insufficient to control the thickness of the electrode active material layer. That is, the spacer of the present exemplary embodiment does not act a thickness controller for the electrode as described in the background art.

The diameter ratio of the active material to the spacer can be in a range of 0.5 to 20, preferably 1 to 10 and more preferably 1.5 to 6. In the present specification, the diameters mean average diameters. The specific surface area of the spacer is preferably 50 $m^2/g$ or less for accessible initial coulombic efficiency. On the other hand, the specific surface area of the spacer is preferably over 10 $m^2/g$, more preferably 20 $m^2/g$ or more. That is, the spacer does not contribute the capacity of the battery and therefore, the spacer composed of a hard carbon cannot act as an anode active material when using in the anode active material layer. As an example, the spacer can be hard carbon, this is because, firstly, hard carbon has good electric conductivity; secondly, the sp3 bond of hard carbon makes it hard to be deformed at the pressing, which is different from graphite; thirdly, the hard carbon is easily to be synthesized into various morphologies by hydrothermal method. The spacer can control the space in the electrode active layer by the size and the shape thereof.

The hard carbon spacer can be obtained by the following method:

A precursor, for example saccharides such as glucose and sucrose, is used to prepare hard carbon particles. The typical preparation process can be described simply in two steps, which is namely as dewatering at low temperature and carbonization at high temperature. In the dewatering process, 0.5 to 2 M of aqueous precursor solution is filled in a stainless steel autoclave and followed with hydrothermal treatment at 180 to 220° C. for 1 to 5 hours to obtain black powders. The obtained black powders are further carbonized in a nitrogen flowed oven at 800 to 1200° C. for several hours, for example 4 hours. Thus obtained hard carbon particles can be classified by the conventional classifying method to obtain spacers having a desired diameter.

<Preparation of Anode>

Anode can be fabricated, for example, by forming an anode active material layer containing an anode active material composed of the carbon material, the spacer and a binder, on an anode current collector. The anode active material layer can be formed by a usual slurry applying method. Specifically, a slurry containing the anode active material, the spacer and the binder and a solvent is prepared, applied on the anode current collector, dried, and as required, pressed to thereby obtain an anode. An applying method of the anode slurry includes a doctor blade method, a die coater method, and a dip coating method. The anode may be obtained by in advance forming an anode active material layer, and thereafter forming a thin film of aluminum, nickel or an alloy thereof as a current collector by a method of vapor deposition, sputtering or the like.

The binder for the anode is not especially limited, but includes polyvinylidene fluoride (PVdF), vinylidene fluoride-hex afluoropropylene copolymers, vinylidene fluoride-tetrafluoroethylene copolymers, styrene-butadiene copolymer rubber, polytetrafluoroethylene, polypropylene, polyethylene, polyimide, polyamideimide, methyl (meth)acrylate, ethyl (meth)acrylate, butyl (meth)acrylate, (meth)acrylonitrile, isoprene rubber, butadiene rubber, and fluororubber. As the slurry solvent, N-methyl-2-pyrrolidone (NMP) and water can be used. In the case of using water as the solvent, further as a thickener, there can be used carboxymethyl cellulose, methyl cellulose, hydroxymethyl cellulose, ethyl cellulose, or polyvinyl alcohol.

The content of the binder for the anode is preferably in the range of 0.1 to 30 parts by mass with respect to 100 parts by mass of an anode active material, more preferably in the range of 0.5 to 25 parts by mass, and still more preferably in the range of 1 to 20 parts by mass, from the viewpoint of the binding capability and the energy density, which are in a tradeoff relationship.

The anode current collector is not especially limited, but, from the electrochemical stability, is preferably copper, nickel, a stainless steel, molybdenum, tungsten, tantalum or an alloy containing two or more thereof. The shape includes a foil, a flat plate and a mesh form.

(Cathode)

As for the positive electrode active material, there is also no particular restriction on the type or nature thereof, known cathode materials can be used for practicing the present invention. The cathode materials may be at least one material selected from the group consisting of lithium cobalt oxide, lithium nickel oxide, lithium manganese oxide, lithium vanadium oxide, lithium-mixed metal oxide, lithium iron phosphate, lithium manganese phosphate, lithium vanadium phosphate, lithium mixed metal phosphates, metal sulfides, and combinations thereof. The positive electrode active material may also be at least one compound selected from chalcogen compounds, such as titanium disulfate or molybdenum disulfate. More preferred are lithium cobalt oxide (e.g., $Li_xCoO_2$ where $0.8 \leq x \leq 1$), lithium nickel oxide (e.g., $LiNiO_2$) and lithium manganese oxide (e.g., $LiMn_2O_4$ and $LiMnO_2$) because these oxides provide a high cell voltage. Lithium iron phosphate is also preferred due to its safety feature and low cost. All these cathode materials can be prepared in the form of a fine powder, nano-wire, nano-rod, nano-fiber, or nano-tube. They can be readily mixed with an additional conductor such as acetylene black, carbon black, and ultra-fine graphite particles.

In this invention, it is preferably to use layered structure lithium-mixed metal oxide such as $LiCo_{0.8}Ni_{0.2}O_2$, $LiNi_{0.4}Co_{0.3}Mn_{0.3}O_2$, $LiNi_{0.5}Co_{0.2}Mn_{0.3}O_2$, $LiNi_{0.5}Co_{0.3}Mn_{0.2}O_2$, $LiNi_{0.8}Co_{0.1}Mn_{0.1}O_2$, $LiNi_{0.8}Co_{0.15}Al_{0.05}O_2$, $Li_{1.2}Mn_{0.4}Ni_{0.4}O_2$, $Li_{1.2}Mn_{0.6}Ni_{0.2}O_2$, $Li_{1.2}Mn_{0.56}Ni_{0.17}Co_{0.07}O_2$, $Li_{1.2}Mn_{0.54}Ni_{0.13}Co_{0.13}O_2$, $Li_{1.2}Mn_{0.56}Ni_{0.17}Co_{0.07}O_2$, $Li_{1.2}Mn_{0.54}Ni_{0.13}Co_{0.13}O_2$, $LiNi_{0.8}CO_{0.15}Al_{0.05}O_2$, $LiNi_{0.5}Mn_{1.48}Al_{0.02}O_4$, $LiNi_{0.4}CO_{0.2}Mn_{1.25}Ti_{0.15}O_4$, $Li_{1.2}Ni_{0.18}Mn_{0.54}Co_{0.08}O_2$ as cathode materials. Moreover, the layered structure cathode materials can be used alone or in combination of two or more materials. For example, NCM523 can be combined with NCM811 with the ratio of 1:1 as cathode materials. Here, NCMabc such as NCM523 and NCM811 is an abbreviation of lithium-nickel-cobalt-manganese complex oxides where a, b and c are mole ratios of nickel, cobalt and manganese, respectively.

The specific surface area of the cathode material can be controlled in a range of 0.01 to 20 $m^2/g$, preferably 0.05 to 15 $m^2/g$, more preferably 0.1 to 10 $m^2/g$ and most preferably 0.15 to 8 $m^2/g$. The diameter of the cathode material can be in a range of 250 nm to 50 μm, preferably 500 nm to 40 μm.

As the binder for the cathode, but it is not especially limited, the same ones as the binders for the anode can be used. Among these, from the viewpoint of the versatility and the low cost, polyvinylidene fluoride is preferable. The content of the binder for the cathode is preferably in the range of 1 to 25 parts by mass with respect to 100 parts by mass of a positive electrode active material, more preferably in the range of 2 to 20 parts by mass, and still more preferably in the range of 2 to 10 parts by mass, from the viewpoint of the binding capability and the energy density, which are in a tradeoff relationship. Binders other than polyvinylidene fluoride (PVdF) include vinylidene fluoride-hex afluoropropylene copolymers, vinylidene fluoride-tetrafluoroethylene copolymers, styrene-butadiene copolymer rubber, polytetrafluoroethylene, polypropylene, polyethylene, polyimide and polyamideimide. As a slurry solvent, N-methyl-2-pyrrolidone (NMP) can be used.

As the cathode current collector, but it is not especially limited, there can be used, for example, aluminum, titanium, tantalum, stainless steel (SUS), another valve metal or an alloy thereof from the viewpoint of the electrochemical stability. The shape includes a foil, a flat plate shape and a mesh form and the like. Particularly an aluminum foil can suitably be used.

(Electrolytic Solution)

Electrolytic solution includes an electrolyte, an additive and non-aqueous solvent. In particular, the electrolytic solution of the present invention includes an imide anion based lithium salt as one kind of electrolyte salt and lithium difluorophosphate ($LiPO_2F_2$) as an additive.

<Electrolyte>

The electrolyte is used as a composite of an imide anion based lithium salt such as lithium bis(fluorosulfonyl) imide (LiFSI) and a conventional lithium salt, such as lithium hexafluorophosphate ($LiPF_6$), lithium tetrafluoroborate ($LiBF_4$) et al. A composite of LiFSI and $LiPF_6$ is preferably used.

Figure 13:
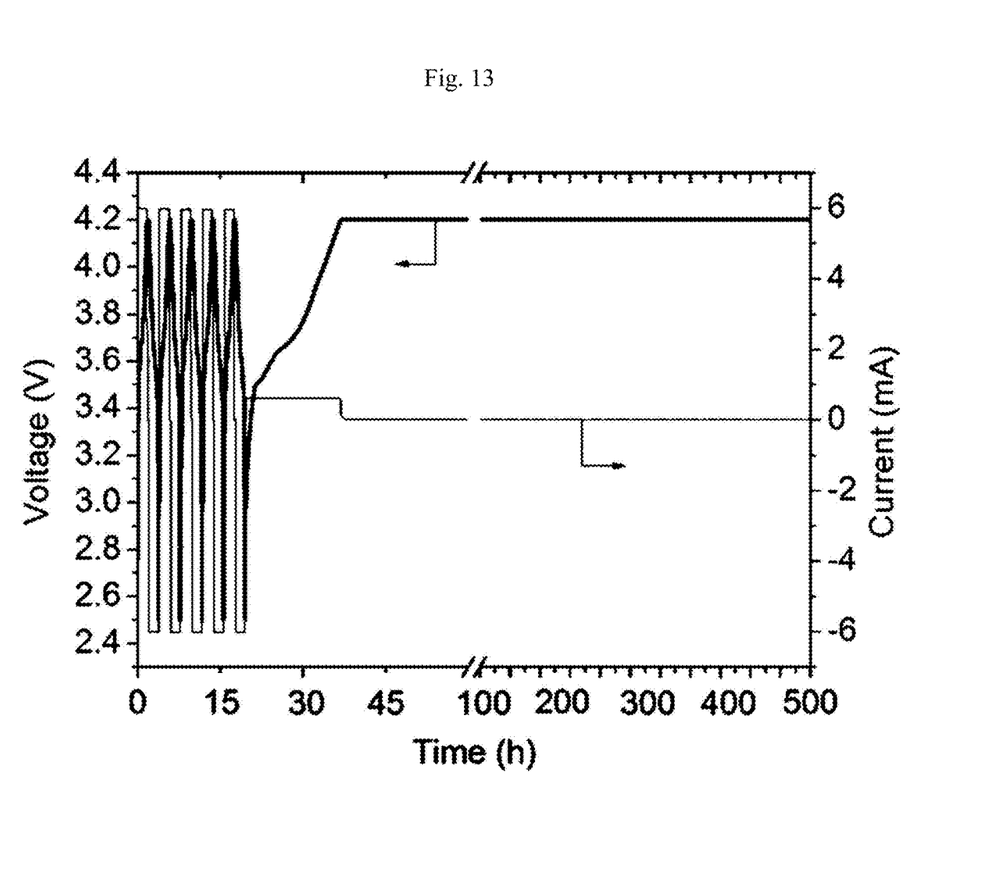
FIG. 13 shows results of 4.2V, 500h floating corrosion test.

The total concentration of the electrolyte can be in the range of 0.1 to 3 moles/L. The range is preferable from 0.5 to 2 moles/L. When the total concentration is 0.1 moles/L or more, sufficient ion conductivity can be obtained. When the total concentration is 3 moles/L or less, it can be avoided to become the viscosity of electrolytic solution too high. The mole ratio of the imide anion based lithium salt to the conventional lithium salt can be selected from 1/9 to 9/1. The use of the imide anion based lithium salt can have to a quick desolvation effect when intercalation, which attributes to faster charging rate than a conventional electrolyte system. However, the usage of pure ionic liquid such as LiFSI will etch the Al current collector at a full charged state; the use of composite electrolyte can effectively prevent the corrosion of Al current collector. The 4.2 floating experiment is shown in FIG. 13. The floating experiment was carried out by using a test cell of Example 1 below described. The test cell was repeated charging (1 C CCCV) and discharging (1 C CC) at five times from 2.5V to 4.2V and thereafter charged to 4.2V and kept at floating state at 4.2V for 500h. As shown in FIG. 13, voltage and current are flat so that it can be learned there is no corrosion current even float in 4.2V for 500h.

<Solvent>

A wide range of solvent can be used for lithium ion batteries. Most preferred are non-aqueous and polymer gel electrolytes although other types can be used. Any known non-aqueous solvent which has been employed as a solvent for a lithium secondary battery can be employed. A mixed solvent comprising ethylene carbonate (EC) and at least one kind of non-aqueous solvent whose melting point is lower than that of ethylene carbonate and whose donor number is 18 or less may be preferably employed as the non-aqueous solvent. This non-aqueous solvent is advantageous in that it is (a) stable against a negative electrode containing a carbonaceous material well developed in graphite structure; (b) effective in suppressing the reductive or oxidative decomposition of electrolyte; and (c) high ion conductivity. A non-aqueous solvent solely composed of ethylene carbonate (EC) is advantageous in that it is relatively stable against decomposition although a reduction by a graphitized carbonaceous material. However, the melting point of EC is relatively high, 39-40° C., and the viscosity thereof is relatively high, so that the conductivity thereof is low, thus making EC alone unsuited for use as a secondary battery electrolyte solvent to be operated at room temperature or lower. The second solvent to be used in the mixed solvent with EC functions to make the viscosity of the mixed solvent lowering than that of which EC is used alone, thereby improving an ion conductivity of the mixed solvent. Furthermore, when the second solvent having a donor number of 18 or less (the donor number of ethylene carbonate is 16.4) is employed, the aforementioned ethylene carbonate can be easily and selectively solvated with lithium ion, so that the reduction reaction of the second solvent with the carbonaceous material well developed in graphitization is assumed to be suppressed. Further, when the donor number of the second solvent is controlled to not more than 18, the oxidative decomposition potential to the lithium electrode can be easily increased to 4 V or more, so that it is possible to manufacture a lithium secondary battery of high voltage. Preferable second solvents are dimethyl carbonate (DMC), methyl ethyl carbonate (MEC), diethyl carbonate (DEC), ethyl propionate, methyl propionate, propylene carbonate (PC), γ-butyrolactone (γ-BL), acetonitrile (AN), ethyl acetate (EA), propyl formate (PF), methyl formate (MF), toluene, xylene and methyl acetate (MA). These second solvents may be employed singly or in a combination of two or more. More desirably, this second solvent should be selected from those having a donor number of 16.5 or less. The viscosity of this second solvent should preferably be 28 cps or less at 25° C. The mixing ratio of the aforementioned ethylene carbonate in the mixed solvent should preferably be 10 to 80% by volume. If the mixing ratio of the ethylene carbonate falls outside this range, the conductivity of the solvent may be lowered or the solvent tends to be more easily decomposed, thereby deteriorating the charge/discharge efficiency. More preferable mixing ratio of the ethylene carbonate is 15 to 50% by volume. The larger content of EC will attribute to higher energy cost of desolvation which affects the charging speed. DMC and EMC are also included in this invention as a ternary solvent system of EC/DMC/EMC for better viscosity and ion conduction. The volume ratio of EC/DMC/EMC is defined as x:y:100-x-y, where x is 15 to 50% by volume, y is 20 to 60% by volume and x+y is less than 100% by volume. The volume ratio y of DMC is more preferably 30 to 50% by volume.

<Additives>

In the invention, lithium difluorophosphate ($LiPO_2F_2$) is added to the solvent for better rate capability. An additive amount of $LiPO_2F_2$ is preferably 0.005 to 7% by mass and more preferably 0.01 to 5% by mass. The decomposition of $LiPO_2F_2$ can form a thin and highly conductive film on cathode materials that favorable to the fast charge and discharge capability.

(Cell)

The positive and negative electrodes can be stacked with interposing a separator therebetween. The separator can be selected from a synthetic resin nonwoven fabric, porous polyethylene film, porous polypropylene film, or porous PTFE film.

A casing for the battery in the exemplary embodiment may be, for example, a laminate film in which a substrate, a metal foil and a sealant are sequentially laminated. Examples of a substrate which can be used include a resin film with a thickness of 10 to 25 μm made of polyester (PET) or Nylon. A metal foil may be an aluminum film with a thickness of 20 to 40 μm. A sealant may be a rein film with a thickness of 30 to 70 μm made of polyethylene (PE), polypropylene (PP), modified polypropylene (mPP) or an ionomer.

EXAMPLES

Comparative Example 1

Cathode:

$LiNi_{1/3}Co_{1/3}Mn_{1/3}O_2$ (abbreviated as NCM111) having an average diameter of 10 μm was used as a cathode active material. Cathode slurry was formulated by the mass ratio of the cathode active material: PVDF:carbon black as 89:4:7 and deposited on a 15 μm-thick of Al current collector with the mass load of 200 g/m². The density of the cathode is controlled at 2.8 g/cm³.

Anode:

Spherical natural graphite having a specific surface area of 5 m²/g and an average diameter of 12 μm was used as an anode active material. Anode slurry was formulated by a mass ratio of the anode active materials: CMC:SBR:carbon black as 92:2:2:4 and deposited on a 20 μm-thick Cu foil with the mass load of 90 g/m². The density of the anode is controlled at 1.4 g/cm³.

Cell:

Thus obtained cathode and anode were laminated interposing porous polypropylene separator. The resultant laminate and an electrolytic solution prepared as follows were sealed into an aluminum laminate container to fabricate a test cell. The energy density of the cell was designed to 200 Wh/kg.

Electrolytic Solution:

1 mole/L of $LiPF_6$ was dissolved in a mixed solvent of EC/DEC=3/7 to prepare an electrolytic solution.

Comparative Example 2

Comparative Example 2 was performed in the same manner as in Comparative Example 1 except for using the following electrolytic solution.

Electrolytic Solutions:

0.65 mole/L of LiFSI and 0.65 mole/L of $LiPF_6$ as an electrolyte and 1% by mass of $LiPO_2F_2$ were dissolved in a mixed solvent of EC/DMC/EMC=2/4/4 to prepare an electrolytic solution.

Comparative Example 3

Comparative Example 3 was performed in the same manner as in Comparative Example 1 except for adding 10 wt % ball spacer (abbreviated as BS) with the average diameter of 6 μm to the anode slurry. The ball spacer is made of hard carbon. The diameter ratio of active material to ball spacer is 2.

Comparative Example 4

Comparative Example 4 was performed in the same manner as in Comparative Example 1 except for adding 10 wt % ball spacer with the average diameter of 2 μm to the anode slurry. The diameter ratio of active material to ball spacer is 6.

Comparative Example 5

Comparative Example 5 was performed in the same manner as in Comparative Example 1 except for adding 5 wt % ball spacer with the average diameter of 6 μm to the cathode slurry. The diameter ratio of active material to ball spacer is 1.6.

Comparative Example 6

Comparative Example 6 was performed in the same manner as in Comparative Example 1 except for adding 5 wt % ball spacer with the average diameter of 2 μm to the cathode slurry. The diameter ratio of active material to ball spacer is 5.

Example 1

Figure 7:
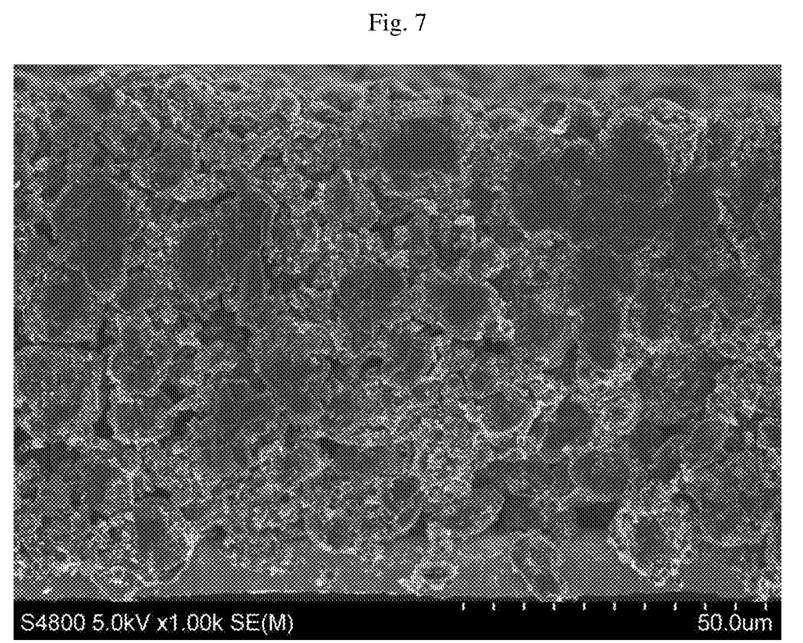
FIG. 7 shows a SEM image of the cross section of the anode in Example 1.

Example 1 was performed in the same manner as in Comparative Example 1 except for adding 10 wt % ball spacer with the average diameter of 2 μm to the anode slurry. The diameter ratio of active material to ball spacer is 6. The cross section image of electrode is shown in FIG. 7.

Electrolytic Solution:

0.65 mole/L of LiFSI and 0.65 mole/L of $LiPF_6$ as an electrolyte and 1% by mass of $LiPO_2F_2$ were dissolved in a mixed solvent of EC/DMC/EMC=2/4/4 to prepare an electrolytic solution.

Example 2

Figure 2:
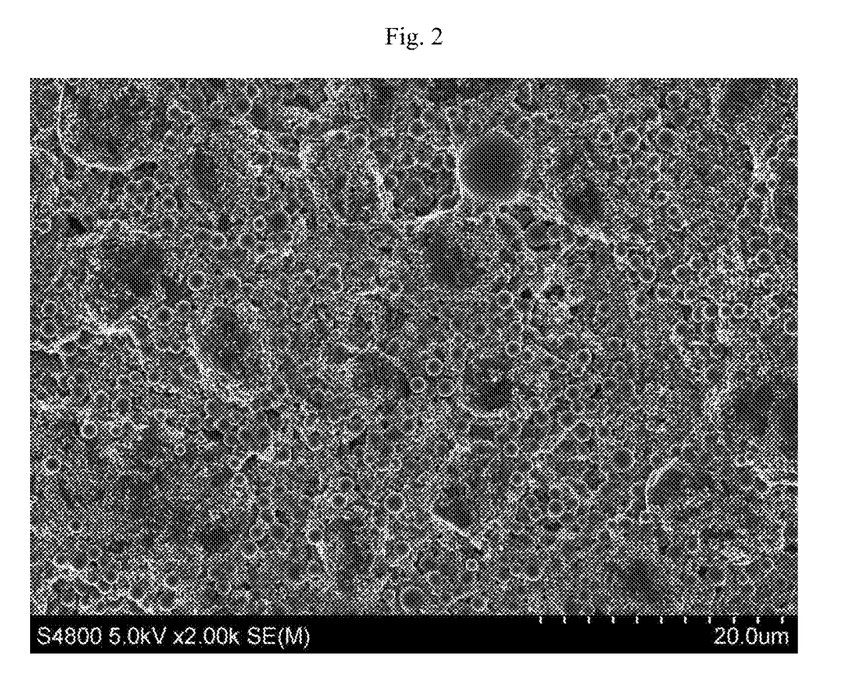
FIG. 2 shows a SEM image of the surface of the anode in Example 2.
Figure 3:
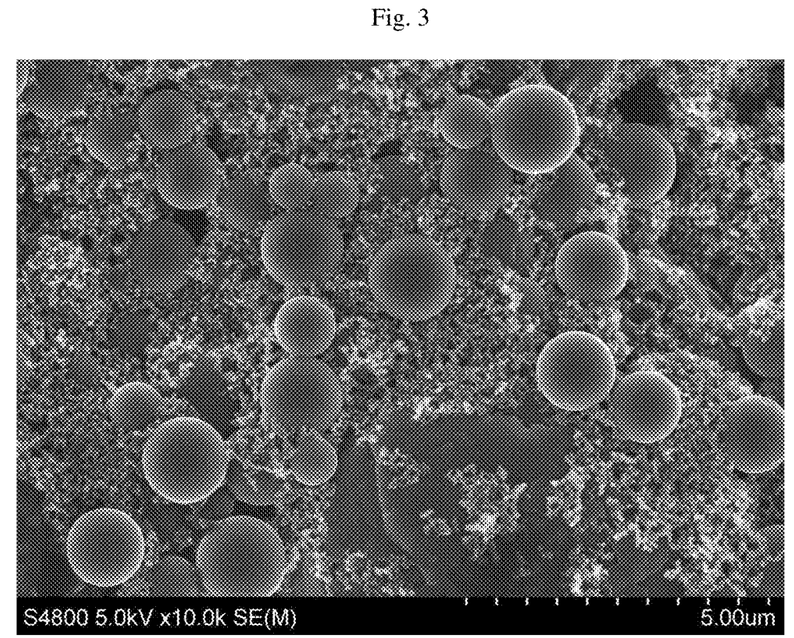
FIG. 3 shows another SEM image of the surface of the anode in Example 2.

Example 2 was performed in the same manner as in Comparative Example 1 except for adding 20 wt % ball spacer with the average diameter of 2 μm to the anode slurry. The diameter ratio of active material to ball spacer is 6. The surface image of the electrode is shown in FIG. 2 and FIG. 3.

Electrolytic Solution:

0.65 mole/L of LiFSI and 0.65 mole/L of $LiPF_6$ as an electrolyte and 1% by mass of $LiPO_2F_2$ were dissolved in a mixed solvent of EC/DMC/EMC=2/4/4 to prepare an electrolytic solution.

Example 3

Figure 4:
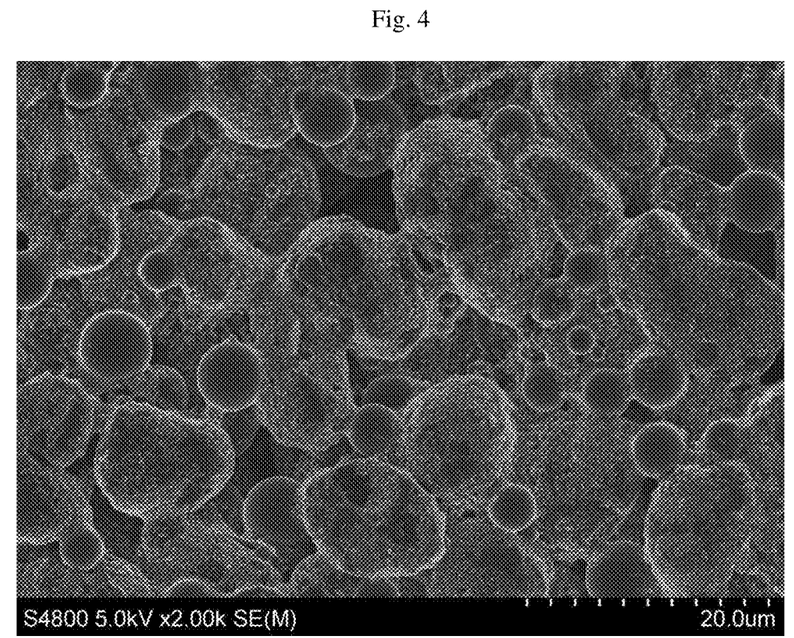
FIG. 4 shows a SEM image of the surface of the anode in Example 3.
Figure 8:
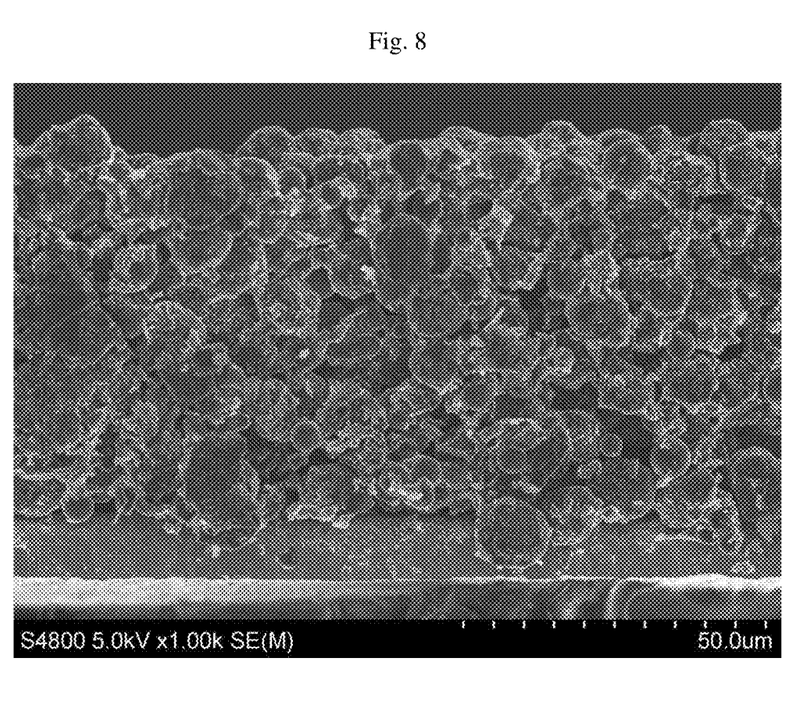
FIG. 8 shows a SEM image of the cross section of the anode in Example 3.

Example 3 was performed in the same manner as in Comparative Example 1 except for adding 10 wt % ball spacer with the average diameter of 6 μm to the anode slurry. The diameter ratio of active material to ball spacer is 2. The electrode surface is shown in FIG. 4. The cross section image of the electrode is shown in FIG. 8.

Electrolytic Solution:

0.65 mole/L of LiFSI and 0.65 mole/L of $LiPF_6$ as an electrolyte and 1% by mass of $LiPO_2F_2$ were dissolved in a mixed solvent of EC/DMC/EMC=2/4/4 to prepare an electrolytic solution.

Example 4

Figure 5:
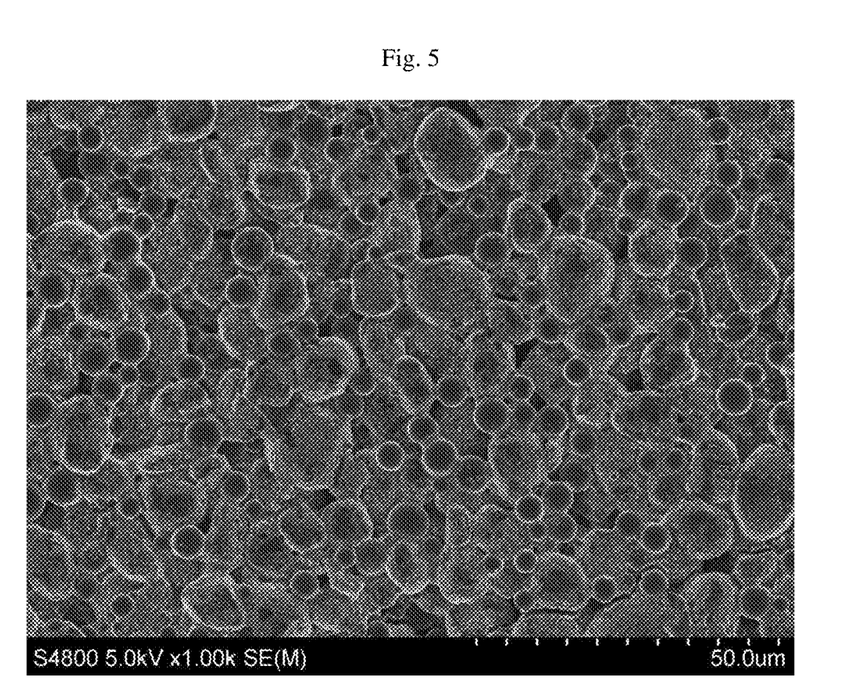
FIG. 5 shows a SEM image of the surface of the anode in Example 4.
Figure 9:
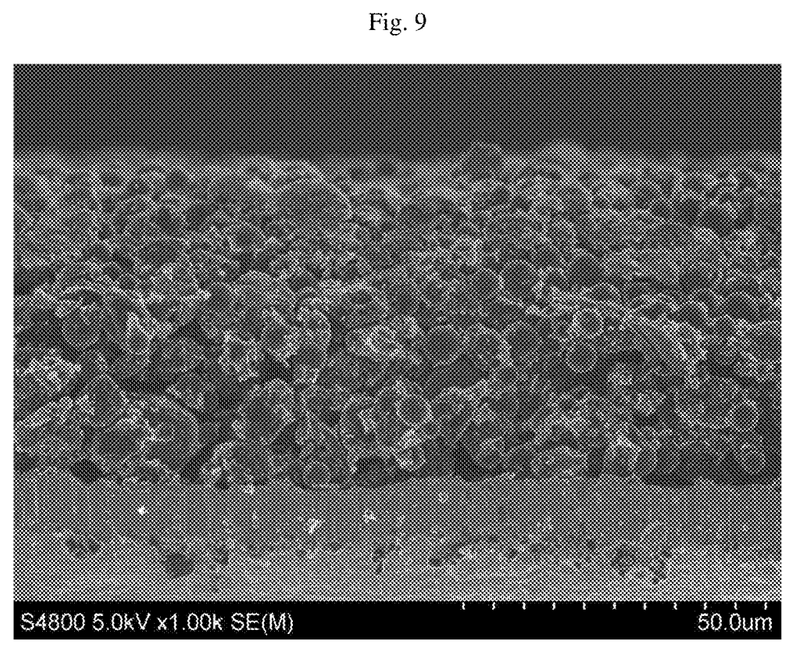
FIG. 9 shows a SEM image of the cross section of the anode in Example 4.

Example 4 was performed in the same manner as in Comparative Example 1 except for adding 20 wt % ball spacer with the average diameter of 6 μm to the anode slurry. The diameter ratio of active material to ball spacer is 2. The image of electrode surface is shown in FIG. 5. The cross section image of the electrode is shown in FIG. 9.

Electrolytic Solution:

0.65 mole/L of LiFSI and 0.65 mole/L of $LiPF_6$ as an electrolyte and 1% by mass of $LiPO_2F_2$ were dissolved in a mixed solvent of EC/DMC/EMC=2/4/4 to prepare an electrolytic solution.

Example 5

Figure 6:
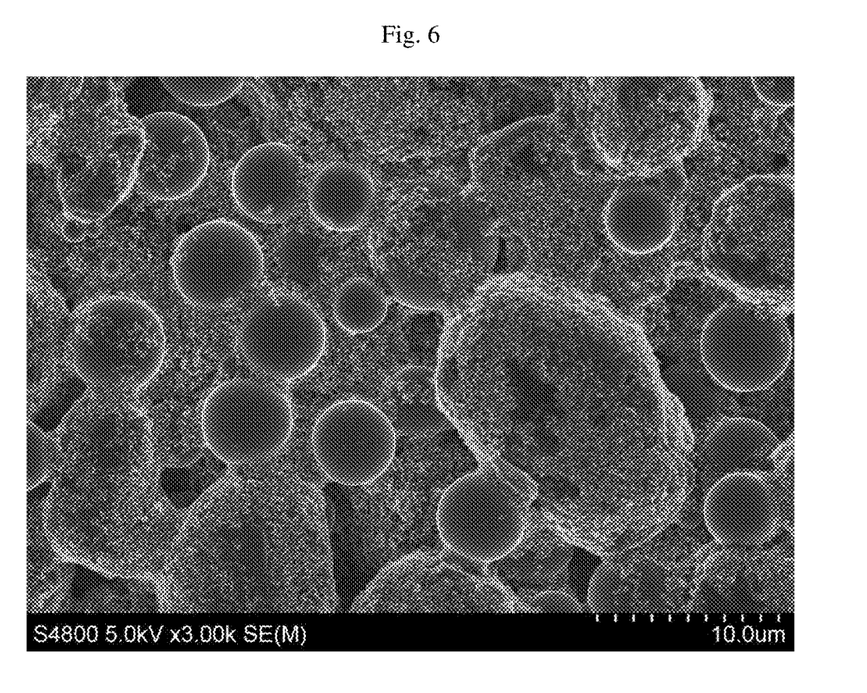
FIG. 6 shows a SEM image of the surface of the anode in Example 5.

Example 5 was performed in the same manner as in Comparative Example 1 except for adding 5 wt % ball spacer with the average diameter of 6 μm to the anode slurry. The diameter ratio of active material to ball spacer is 2. The image of electrode surface is shown in FIG. 6.

Electrolytic Solution:

0.65 mole/L of LiFSI and 0.65 mole/L of $LiPF_6$ as an electrolyte and 1% by mass of $LiPO_2F_2$ were dissolved in a mixed solvent of EC/DMC/EMC=2/4/4 to prepare an electrolytic solution.

Example 6

Figure 10:
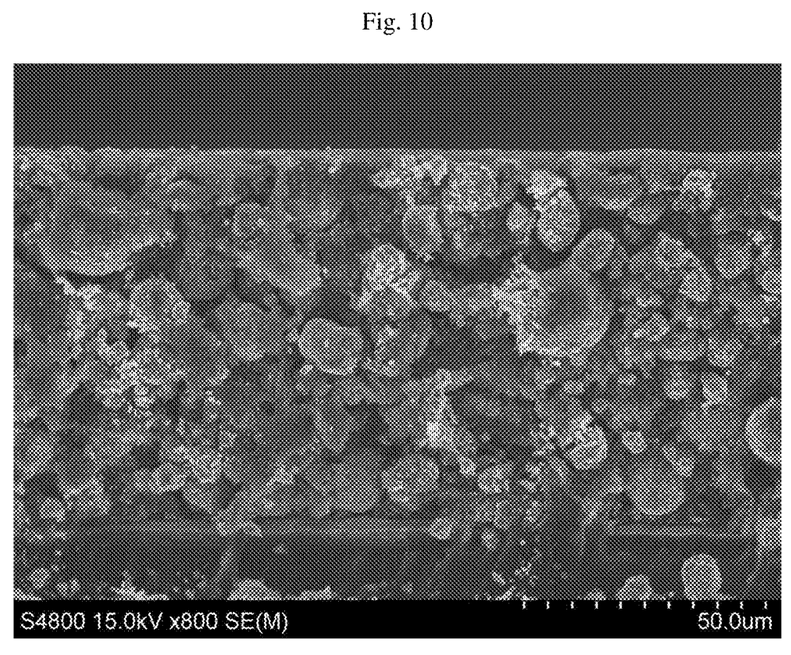
FIG. 10 shows a SEM image of the cross section of the cathode in Example 6.

Example 6 was performed in the same manner as in Comparative Example 1 except for adding 5 wt % ball spacer with the average diameter of 2 μm to the cathode slurry. The diameter ratio of active material to ball spacer is 5. The cross section image of the electrode is shown in FIG. 10.

Electrolytic Solution:

0.65 mole/L of LiFSI and 0.65 mole/L of $LiPF_6$ as an electrolyte and 1% by mass of $LiPO_2F_2$ were dissolved in a mixed solvent of EC/DMC/EMC=2/4/4 to prepare an electrolytic solution.

Example 7

Figure 11:
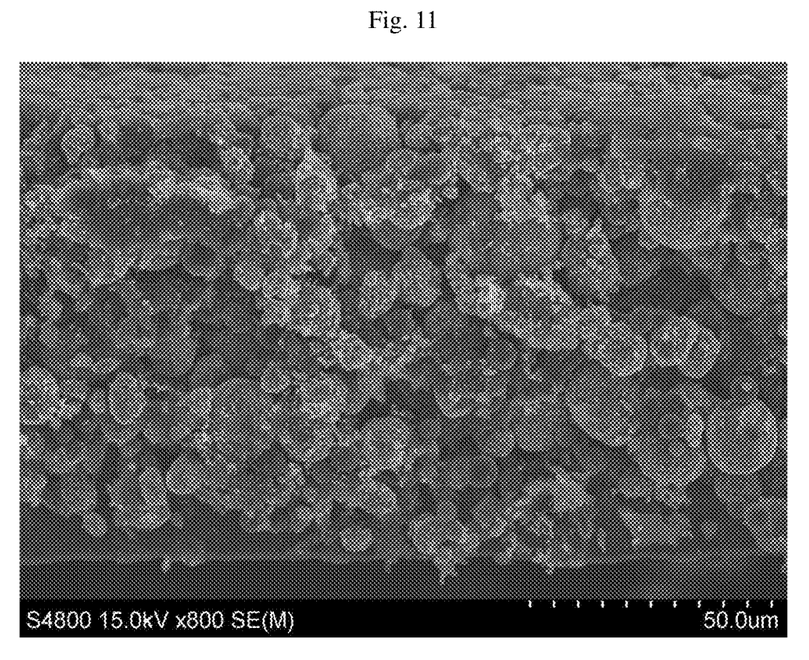
FIG. 11 shows a SEM image of the cross section of the cathode in Example 7.

Example 7 was performed in the same manner as in Comparative Example 1 except for adding 5 wt % ball spacer with the average diameter of 6 μm to the cathode slurry. The diameter ratio of active material to ball spacer is 1.6. The cross section image of the electrode is shown in FIG. 11.

Electrolytic Solution:

0.65 mole/L of LiFSI and 0.65 mole/L of $LiPF_6$ as an electrolyte and 1% by mass of $LiPO_2F_2$ were dissolved in a mixed solvent of EC/DMC/EMC=2/4/4 to prepare an electrolytic solution.

Example 8

Example 8 was performed in the same manner as in Comparative Example 1 except for adding 10 wt % ball spacer with the average diameter of 2 μm to the cathode slurry. The diameter ratio of active material to ball spacer is 5.

Electrolytic Solution:

0.65 mole/L of LiFSI and 0.65 mole/L of $LiPF_6$ as an electrolyte and 1% by mass of $LiPO_2F_2$ were dissolved in a mixed solvent of EC/DMC/EMC=2/4/4 to prepare an electrolytic solution.

Example 9

Figure 12:
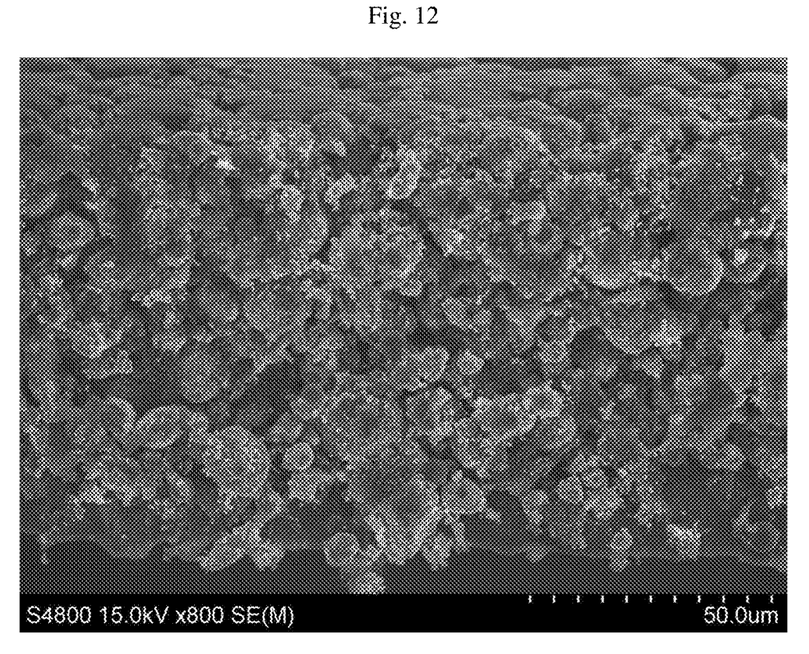
FIG. 12 shows a SEM image of the cross section of the cathode in Example 9.

Example 9 was performed in the same manner as in Comparative Example 1 except for adding 10 wt % ball spacer with the average diameter of 6 μm to the cathode slurry. The diameter ratio of active material to ball spacer is 1.6. The cross section image of the electrode is shown in FIG. 12.

Electrolytic Solution:

0.65 mole/L of LiFSI and 0.65 mole/L of $LiPF_6$ as an electrolyte and 1% by mass of $LiPO_2F_2$ were dissolved in a mixed solvent of EC/DMC/EMC=2/4/4 to prepare an electrolytic solution.

Example 10

Example 10 was performed in the same manner as in Comparative Example 1 except for adding 5 wt % ball spacer with the average diameter of 6 μm to the anode and cathode slurry, respectively. The diameter ratios of anode and cathode active materials to ball spacer are 2 and 1.6, respectively.

Electrolytic Solution:

0.65 mole/L of LiFSI and 0.65 mole/L of $LiPF_6$ as an electrolyte and 1% by mass of $LiPO_2F_2$ were dissolved in a mixed solvent of EC/DMC/EMC=2/4/4 to prepare an electrolytic solution.

Electrochemical Characterization

The rate capability was characterized for each cell. Specifically, the cells were charged from 2.5V to 4.2V in 0.1 C, 0.2 C, 0.5 C, 1 C, 2 C, 3 C, 4 C, 6 C, 8 C, 10 C in constant current (CC) mode and discharged from 4.2V to 2.5V in 0.1 C in CC mode. The capacity ratio 6 C/0.1 C and 10 C/0.1 C are used to evaluate the rate performance of the cells.

TABLE 1

| | Electrodes | | Diameter | Electrolytic solution | | | Rate characteristics (%) | |
|---|---|---|---|---|---|---|---|---|
| | Anode | Cathode | ratio | Electrolyte | Additives | Solvent | 6 C/0.1 C | 10 C/0.1 C |
| Comperative example 1 | Graphite | NCM111 | / | 1M LiPF$_6$ | None | EC/DEC (3/7) | 54 | 32 |
| Comperative example 2 | Graphite | NCM111 | / | 0.65M LiPF$_6$ 0.65M LiFSI | 1 wt % LiPO$_2$F$_2$ | EC/DMC/EMC (2/4/4) | 64 | 33 |
| Comperative example 3 | Graphite + 10 wt % 6 μmBS | NCM111 | 2 | 1M LiPF$_6$ | None | EC/DEC (3/7) | 67 | 37 |
| Comperative example 4 | Graphite + 10 wt % 2 μmBS | NCM111 | 6 | 1M LiPF$_6$ | None | EC/DEC (3/7) | 66 | 35 |
| Comperative example 5 | Graphite | NCM111 + 5 wt % 6 μmBS | 1.6 | 1M LiPF$_6$ | None | EC/DEC (3/7) | 57 | 34 |
| Comperative example 6 | Graphite | NCM111 + 5 wt % 2 μmBS | 5 | 1M LiPF$_6$ | None | EC/DEC (3/7) | 56 | 34 |
| Example 1 | Graphite + 10 wt % 2 μmBS | NCM111 | 6 | 0.65M LiPF$_6$ 0.65M LiFSI | 1 wt % LiPO$_2$F$_2$ | EC/DMC/EMC (2/4/4) | 73 | 42 |
| Example 2 | Graphite + 20 wt % 2 μmBS | NCM111 | 6 | 0.65M LiPF$_6$ 0.65M LiFSI | 1 wt % LiPO$_2$F$_2$ | EC/DMC/EMC (2/4/4) | 76 | 47 |
| Example 3 | Graphite + 10 wt % 6 μmBS | NCM111 | 2 | 0.65M LiPF$_6$ 0.65M LiFSI | 1 wt % LiPO$_2$F$_2$ | EC/DMC/EMC (2/4/4) | 77 | 45 |
| Example 4 | Graphite + 20 wt % 6 μmBS | NCM111 | 2 | 0.65M LiPF$_6$ 0.65M LiFSI | 1 wt % LiPO$_2$F$_2$ | EC/DMC/EMC (2/4/4) | 75 | 46 |
| Example 5 | Graphite + 5 wt % 6 μmBS | NCM111 | 2 | 0.65M LiPF$_6$ 0.65M LiFSI | 1 wt % LiPO$_2$F$_2$ | EC/DMC/EMC (2/4/4) | 77 | 54 |
| Example 6 | Graphite | NCM111 + 5 wt % 2 μmBS | 5 | 0.65M LiPF$_6$ 0.65M LiFSI | 1 wt % LiPO$_2$F$_2$ | EC/DMC/EMC (2/4/4) | 67 | 42 |
| Example 7 | Graphite | NCM111 + 5 wt % 6 μmBS | 1.6 | 0.65M LiPF$_6$ 0.65M LiFSI | 1 wt % LiPO$_2$F$_2$ | EC/DMC/EMC (2/4/4) | 71 | 45 |
| Example 8 | Graphite | NCM111 + 10 wt % 2 μmBS | 5 | 0.65M LiPF$_6$ 0.65M LiFSI | 1 wt % LiPO$_2$F$_2$ | EC/DMC/EMC (2/4/4) | 68 | 42 |
| Example 9 | Graphite | NCM111 + 10 wt % 6 μmBS | 1.6 | 0.65M LiPF$_6$ 0.65M LiFSI | 1 wt % LiPO$_2$F$_2$ | EC/DMC/EMC (2/4/4) | 73 | 46 |
| Example 10 | Graphite + 5 wt % 6 μmBS | NCM111 + 5 wt % 6 μmBS | 2/1.6 | 0.65M LiPF$_6$ 0.65M LiFSI | 1 wt % LiPO$_2$F$_2$ | EC/DMC/EMC (2/4/4) | 77 | 55 |

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

INDUSTRIAL APPLICABILITY

The lithium ion battery of the present invention can have fast chargeability with high energy density. Therefore, the lithium ion battery of the present invention is highly suitable for hybrid vehicles (HVs), plug-in hybrid vehicles (PHVs), electric vehicles (EVs), and stationary power source applications for smarter energy management systems.

REFERENCE SIGNS LIST

1: Active material layer
1A: Active material
2: Current collector
3: Electrolyte
4: Spacer

The invention claimed is:
1. A lithium ion battery, comprising:
an anode comprising an anode active material layer on an anode current collector, the anode active material layer having a mass load higher than 60g/m$^2$,
a cathode comprising a cathode active material layer on a cathode current collector, the cathode active material layer having a mass load higher than 100g/m$^2$, and
an electrolytic solution comprising an imide anion based lithium salt and LiPO$_2$F$_2$,
wherein
at least one of the anode and cathode active material layers comprises a spacer composed of a hard carbon,
the specific surface area of the spacer is over 10 m$^2$/g and 50 m$^2$/g or less,
the electrolytic solution comprises ethylene carbonate (EC), dimethyl carbonate (DMC), and ethyl methyl carbonate (EMC) as solvents, with the volume ratio of EC/DMC/EMC being x:y:100-x-y, where x is 15 to 50% by volume, y is 20 to 60% by volume, and x+y is less than 100% by volume,
the cathode active material layer comprises at least a lithium nickel cobalt manganese oxide as a cathode active material, and
the anode active material layer comprises at least graphite as an anode active material.
2. The lithium ion battery according to claim 1, wherein a diameter of the spacer is in a range of 500 nm to 20 μm, and the ratio of a diameter of the anode or cathode active material to the diameter of the spacer is in a range of 0.5 to 20.
3. The lithium ion battery according to claim 1, wherein the additive mass ratio of the spacer is in a range of 1 to 30% by mass with respect to 100% by mass of the anode or cathode active material layer.
4. The lithium ion battery according to claim 1, wherein the electrolytic solution comprises a composite of the imide anion based lithium salt and a lithium salt other than the imide anion based lithium salt as an electrolyte, and the mole ratio of the imide anion based lithium salt to the lithium salt other than the imide anion based lithium salt is from 1/9 to 9/1.

5. The lithium ion battery according to claim 4, wherein the total concentration of the electrolyte in the electrolytic solution is in a range of 0.1 to 3 moles/L.

6. The lithium ion battery according to claim 1, wherein the cathode collector is made of aluminum.

7. The lithium ion battery according to claim 1, wherein an additive amount of $LiPO_2F_2$ is 0.005 to 7% by mass with respect to 100% by mass of the electrolytic solution.

8. The lithium ion battery according to claim 1, wherein the graphite as the anode active material is a graphite particle having pores on the surface and having hollow or interconnected pores, or interconnected inside cracks at the core part of the graphite particle.

* * * * *